United States Patent
Li

(10) Patent No.: US 11,908,038 B2
(45) Date of Patent: Feb. 20, 2024

(54) IMAGE TRANSFORMATION METHOD AND APPARATUS, STORAGE MEDIUM, AND COMPUTER DEVICE

(71) Applicant: TENCENT TECHNOLOGY (SHENZHEN) COMPANY LIMITED, Guangdong (CN)

(72) Inventor: Dong Ming Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 417 days.

(21) Appl. No.: 17/346,488

(22) Filed: Jun. 14, 2021

(65) Prior Publication Data

US 2021/0304348 A1    Sep. 30, 2021

Related U.S. Application Data

(63) Continuation of application No. PCT/CN2020/087029, filed on Apr. 26, 2020.

(30) Foreign Application Priority Data

May 10, 2019    (CN) .......................... 201910389112.3

(51) Int. Cl.
*G06T 1/00* (2006.01)

(52) U.S. Cl.
CPC .... *G06T 1/0092* (2013.01); *G06T 2201/0052* (2013.01)

(58) Field of Classification Search
CPC ........... G06T 1/0092; G06T 2201/0052; G06T 2201/0083; G06T 1/0028; G06T 5/10; G06T 2207/20182
See application file for complete search history.

(56) References Cited

U.S. PATENT DOCUMENTS

| 9,886,733 B2 | 2/2018 | Adsumilli |
| 2007/0025590 A1* | 2/2007 | Hwang ................... G06T 1/005 382/100 |

(Continued)

FOREIGN PATENT DOCUMENTS

| CN | 102156956 A | 8/2011 |
| CN | 102708536 A | 10/2012 |

(Continued)

OTHER PUBLICATIONS

Jane, O., & Elbasi, E. (2014). Hybrid non-blind watermarking based on DWT and SVD. Journal of applied research and technology, 12(4), 750-761.*

(Continued)

*Primary Examiner* — Xuemei G Chen
(74) *Attorney, Agent, or Firm* — Sughrue Mion, PLLC

(57) ABSTRACT

An image transformation method includes: obtaining identification information of an original image; converting the identification information to an identification image; performing frequency domain transformation on the original image to obtain a pixel matrix of the original image in a frequency domain space; performing matrix decomposition on the pixel matrix to obtain an image brightness matrix; converting pixel values of corresponding pixels in the image brightness matrix based on pixel values of pixels in the identification image to obtain a converted brightness matrix; and performing inverse frequency domain transformation on the converted brightness matrix to obtain a transformed image including invisible identification information, and adding the invisible identification information to the original image.

16 Claims, 7 Drawing Sheets

(56) References Cited

U.S. PATENT DOCUMENTS

| | | | | |
|---|---|---|---|---|
| 2009/0028453 | A1* | 1/2009 | Collomosse | H04N 1/00307 |
| | | | | 382/243 |
| 2012/0051582 | A1* | 3/2012 | Das Gupta | H04N 1/32261 |
| | | | | 382/100 |
| 2012/0163652 | A1* | 6/2012 | Xu | H04N 1/32149 |
| | | | | 382/100 |
| 2014/0005815 | A1* | 1/2014 | Kakkirala | G10L 19/018 |
| | | | | 700/94 |
| 2015/0086067 | A1* | 3/2015 | Mehta | G06T 1/0071 |
| | | | | 382/100 |
| 2015/0242983 | A1* | 8/2015 | DiGiovanni | H04N 21/43074 |
| | | | | 382/100 |
| 2015/0328467 | A1* | 11/2015 | Demers | A61N 1/37217 |
| | | | | 607/45 |
| 2015/0356306 | A1* | 12/2015 | Carter | G06F 21/64 |
| | | | | 380/246 |
| 2016/0049153 | A1* | 2/2016 | Kakkirala | G10L 19/018 |
| | | | | 700/94 |
| 2017/0163839 | A1* | 6/2017 | Arana | H04N 21/8358 |
| 2018/0232844 | A1* | 8/2018 | Cai | H04N 1/3232 |
| 2020/0296071 | A1* | 9/2020 | Li | G06T 1/005 |

FOREIGN PATENT DOCUMENTS

| | | |
|---|---|---|
| CN | 103024245 A | 4/2013 |
| CN | 104036449 A | 9/2014 |
| CN | 104599225 A | 5/2015 |
| CN | 105303512 A | 2/2016 |
| CN | 105335924 A | 2/2016 |
| CN | 106023054 A | 10/2016 |
| CN | 107610038 A | 1/2018 |
| CN | 110148100 A | 8/2019 |

OTHER PUBLICATIONS

Wang, Hui-qin, Ji-chao Hao, and Fu-ming Cui. "Colour image watermarking algorithm based on the Arnold transform." 2010 International Conference on Communications and Mobile Computing. vol. 1. IEEE, 2010.*
Written Opinion of the International Searching Authority dated Jul. 16, 2020 in Application No. PCT/CN2020/087029.
Chinese Office Action for 201910389112.3 dated, Oct. 9, 2020.
Chinese Office Action for 201910389112.3 dated, Apr. 20, 2021.
Written Opinion of the International Searching Authority for PCT/CN2020/087029 dated, Jul. 16, 2020 (PCT/ISA/237).
International Search Report for PCT/CN2020/087029 dated, Jul. 16, 2020 (PCT/ISA/210).

* cited by examiner

IMAGE TRANSFORMATION METHOD AND APPARATUS, STORAGE MEDIUM, AND COMPUTER DEVICE

CROSS-REFERENCE TO RELATED APPLICATION(S)

This application is a bypass continuation application of International Application No. PCT/CN2020/087029, entitled "IMAGE TRANSFORMATION METHOD AND DEVICE, STORAGE MEDIUM AND COMPUTER EQUIPMENT" and filed on Apr. 26, 2020, which claims priority to Chinese Patent Application No. 201910389112.3, entitled "IMAGE TRANSFORMATION METHOD AND APPARATUS, STORAGE MEDIUM, AND COMPUTER DEVICE" and filed on May 10, 2019, the disclosures of which are herein incorporated by reference in their entireties.

FIELD

The disclosure relates to the field of computer technologies, and in particular, to a method and an apparatus for image transformation, a storage medium, and a computer device.

BACKGROUND

With the continuous development of network technologies, storage, processing, transmission, and use of images become increasingly frequent, and related copyright issues emerge. Therefore, during the image transmission, it is necessary to add identifiable identification information (such as watermarks) to the image, so as to achieve functions such as authenticity identification and copyright protection for the image, and the like. However, the identification information added to the image is mostly visible identification information. The added identification information is not only easy to be cut off, but also affects a viewing effect of the image.

SUMMARY

Embodiments of the disclosure provide an image transformation method and apparatus, a storage medium, and a computer device, which may add invisible identification information to an original image.

According to an aspect of an embodiment of the disclosure, provided is an image transformation method, performed by a computer device and including:
 obtaining identification information of an original image;
 converting the identification information to an identification image;
 performing frequency domain transformation on the original image to obtain a pixel matrix of the original image in a frequency domain space;
 performing matrix decomposition on the pixel matrix to obtain an image brightness matrix;
 converting pixel values of corresponding pixels in the image brightness matrix based on pixel values of pixels in the identification image to obtain a converted brightness matrix; and
 performing inverse frequency domain transformation on the converted brightness matrix to obtain a transformed image including invisible identification information, and adding the invisible identification information to the original image.

According to an aspect of an embodiment of the disclosure, provided is an image transformation method, performed by a computer device and including:
 obtaining a transformed image corresponding to an original image;
 performing frequency domain transformation on the transformed image to obtain a converted brightness matrix of the transformed image in a frequency domain space;
 extracting a pixel value of an identification image from the converted brightness matrix, the identification image being an image obtained by converting identification information of the original image; and
 performing image identification on the identification image to obtain the identification information of the original image.

According to an aspect of an embodiment of the disclosure, provided is an image transformation apparatus, including:
 at least one memory configured to store program code; and
 at least one processor configured to read the program code and operate as instructed by the program code, the program code comprising:
 first obtaining code configured to cause the at least one processor to obtain identification information of an original image;
 information conversion code configured to cause the at least one processor to convert the identification information to an identification image;
 first frequency domain transformation code configured to cause the at least one processor to perform frequency domain transformation on the original image to obtain a pixel matrix of the original image in a frequency domain space;
 decomposition code configured to cause the at least one processor to perform matrix decomposition on the pixel matrix to obtain an image brightness matrix;
 pixel conversion code configured to cause the at least one processor to convert pixel values of corresponding pixels in the image brightness matrix based on pixel values of pixels in the identification image to obtain a converted brightness matrix; and
 inverse transformation code configured to cause the at least one processor to perform inverse frequency domain transformation on the converted brightness matrix to obtain a transformed image including invisible identification information, and add the invisible identification information to the original image.

According to an aspect of an embodiment of the disclosure, provided is an image transformation apparatus including:
 at least one memory configured to store program code; and
 at least one processor configured to read the program code and operate as instructed by the program code, the program code comprising:
 second code configured to cause the at least one processor to obtain a transformed image corresponding to an original image;
 second frequency domain transformation code configured to cause the at least one processor to perform frequency domain transformation on the transformed image to obtain a converted brightness matrix of the transformed image in a frequency domain space;
 extraction code configured to cause the at least one processor to extract a pixel value of an identification image from the converted brightness matrix, the identification image being an image obtained by converting identification information of the original image; and recognition code configured to cause the at least one processor to perform image identification on the identification image to obtain the identification information of the original image.

According to an aspect of an embodiment of the disclosure, provided is a storage medium, storing instructions, the instructions, when executed by a processor, implementing the operations of the image transformation method provided in any one of the embodiments of the disclosure.

According to an aspect of an embodiment of the disclosure, provided is a computer device, including a memory and a processor, the memory storing a plurality of instructions, the processor loading the instructions in the memory to perform the operations of the image transformation method provided in any one of the embodiments of the disclosure.

BRIEF DESCRIPTION OF THE DRAWINGS

To describe the technical solutions of example embodiments of the disclosure more clearly, the following briefly introduces the accompanying drawings for describing the example embodiments. The accompanying drawings in the following description show only some embodiments of the disclosure, and a person of ordinary skill in the art may still derive other drawings from the accompanying drawings without creative efforts.

DETAILED DESCRIPTION

Figure 1:
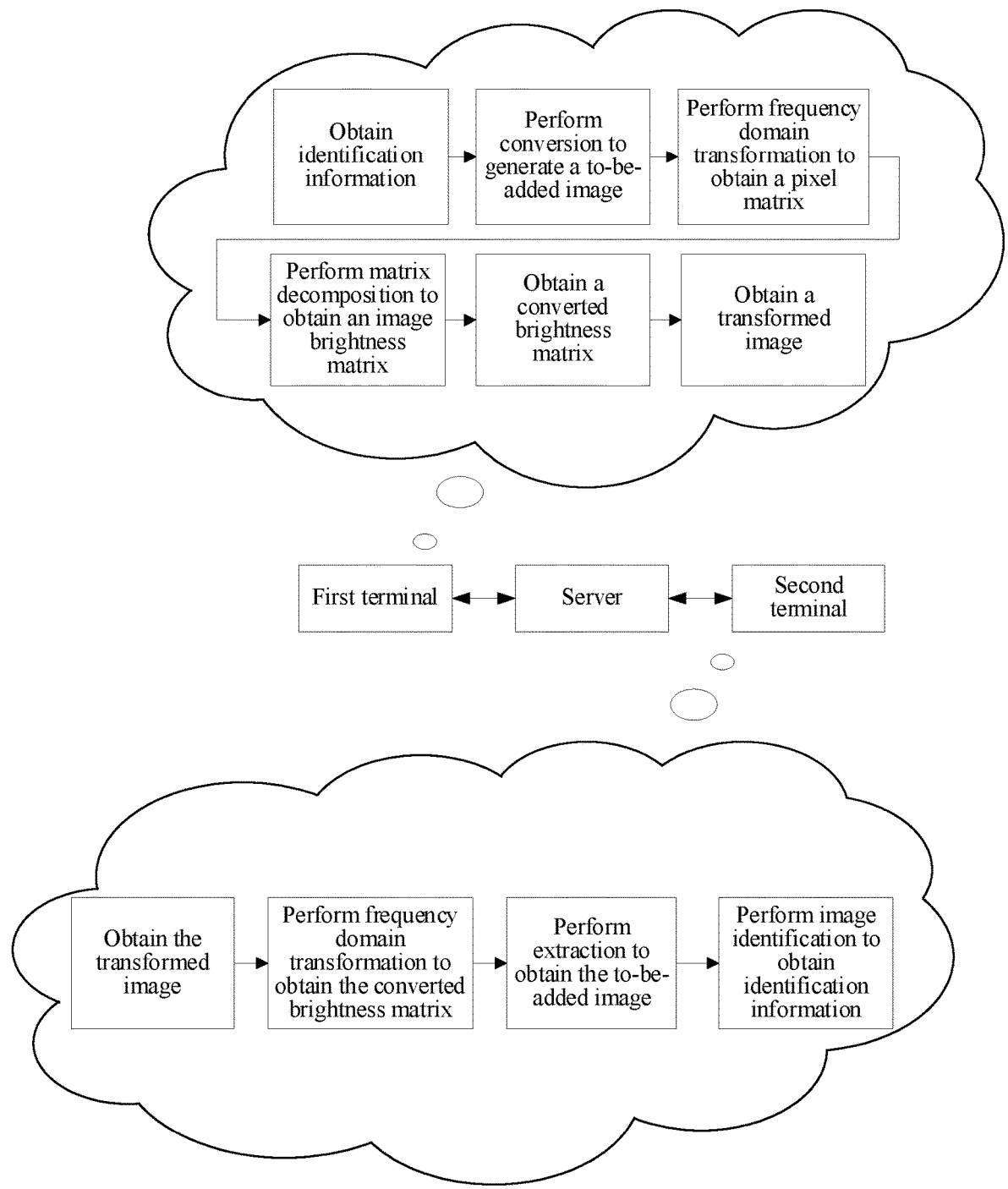
FIG. 1 is a schematic diagram of a scenario of an image transformation system according to an embodiment of the disclosure.

Referring to the drawings, same component symbols represent same components. The inventive concept of the disclosure is described by using examples in which the disclosure is implemented in proper computing environments. The following descriptions are illustrative embodiments of the disclosure based on the examples, and are not to be construed as a limitation to other specific embodiments of the disclosure that are not described herein in detail.

In the following description, the example embodiments of the disclosure are described with reference to steps and symbols of operations that are performed by one or more computers, unless indicated otherwise. Therefore, such steps and operations, which are at times referred to as being computer-executed, include the manipulation by the processing unit of the computer of electrical signals representing data in a structured form. This manipulation transforms the data or maintains the data at locations in the memory system of the computer, which reconfigures or otherwise alters the operation of the computer in a manner readily understood by a person skilled in the art. Data structures in which the data is maintained are physical locations of the memory that have particular properties defined by the format of the data. However, while the inventive concept of the disclosure is being described in the foregoing context, it is not meant to be limiting as a person skilled in the art will appreciate that the various steps and operations described hereinafter may be implemented in hardware.

The term "module" used in the specification may be considered as a software object executed in the calculation system. Different components, modules, engines, and services described in the specification may be considered as objects implemented in the calculation system. The apparatus and method described in the specification may be implemented in a form of software, and definitely may be implemented in a form of hardware, both of which fall within the protection scope of the disclosure.

In the disclosure, the terms "first", "second", "third", and the like are intended to distinguish between different objects but do not indicate a particular order. In addition, the terms "include", "have", and any variant thereof are intended to cover a non-exclusive inclusion. For example, a process, a method, a system, a product, or a device that includes a series of steps or modules is not limited to the listed steps or modules. Instead, some embodiments may further include a step or module that is not listed, or some embodiments may further include another step or module that is intrinsic to the process, the method, the product, or the device.

"Embodiment" mentioned in the specification means that particular features, structures, or characteristics described with reference to the embodiment may be included in at least one embodiment of the disclosure. The terms in various places in the specification do not necessarily all refer to the same embodiment, nor are they independent or alternative embodiments mutually exclusive with other embodiments. A person skilled in the art would understand that the embodiments described in the specification may be combined with other embodiments.

Embodiments of the disclosure provide an image transformation method and apparatus, a storage medium, and a computer device. The image transformation apparatus may be integrated in the computer device, and the computer device may be a terminal, a server, or another device. The terminal may be a mobile phone, a tablet computer, a notebook computer, a personal computer (PC), a micro processing box, or another device.

In the embodiments of the disclosure, the image transformation apparatus is integrated in the terminal (that is, the image transformation method is performed by the terminal) by way of example to introduce the solutions of the disclosure. It is to be understood that, when the image transformation apparatus is integrated in other computer devices such as the server (that is, the image transformation method is performed by other computer devices such as the server), the performing process of the other computer devices may be the same or similar to the performing process of the terminal. For the process, reference may be made to an image transformation process of the terminal.

FIG. 1 is a schematic diagram of a scenario of an image transformation system according to an embodiment of the disclosure. Referring to FIG. 1, an image transformation system provided in an embodiment of the disclosure includes a first terminal, a second terminal, a server, and the like. The server is connected to the first terminal via a network, and the server is also connected to the second terminal via the network.

The server may be configured to share a transformed image obtained by the first terminal with the second terminal, for example, transmit the transformed image obtained by the first terminal to the second terminal.

The first terminal may be configured to generate a transformed image including invisible identification information. For example, identification information of an original image is obtained, the identification information is converted to a to-be-added image (or hereinafter, "identification image"), frequency domain transformation is performed on the original image to obtain a pixel matrix of the original image in a frequency domain space, matrix decomposition is performed on the pixel matrix to obtain an image brightness matrix, and pixel values of corresponding pixels in the image brightness matrix str are converted based on pixel values of pixels in the identification image to obtain a converted brightness matrix, and inverse frequency domain transformation is performed on the converted brightness matrix to obtain a transformed image. The transformed image includes the invisible identification information.

The second terminal may be configured to extract the identification information from the transformed image. For example, the transformed image corresponding to the original image may be obtained (the transformed image may be obtained by using the operations described above), frequency domain transformation is performed on the transformed image to obtain a converted brightness matrix of the transformed image in a frequency domain space, the pixel value of the identification image is extracted from the converted brightness matrix to obtain the identification image, and image identification is performed on the identification image to obtain the identification information of the transformed image (or the identification information of the original image). The identification information of the transformed image is the identification information of the original image, both of which belong to the same concept.

Detailed descriptions are separately provided below. The description sequence of the following embodiments is not intended to limit or imply any preference orders of the embodiments.

Figure 2:
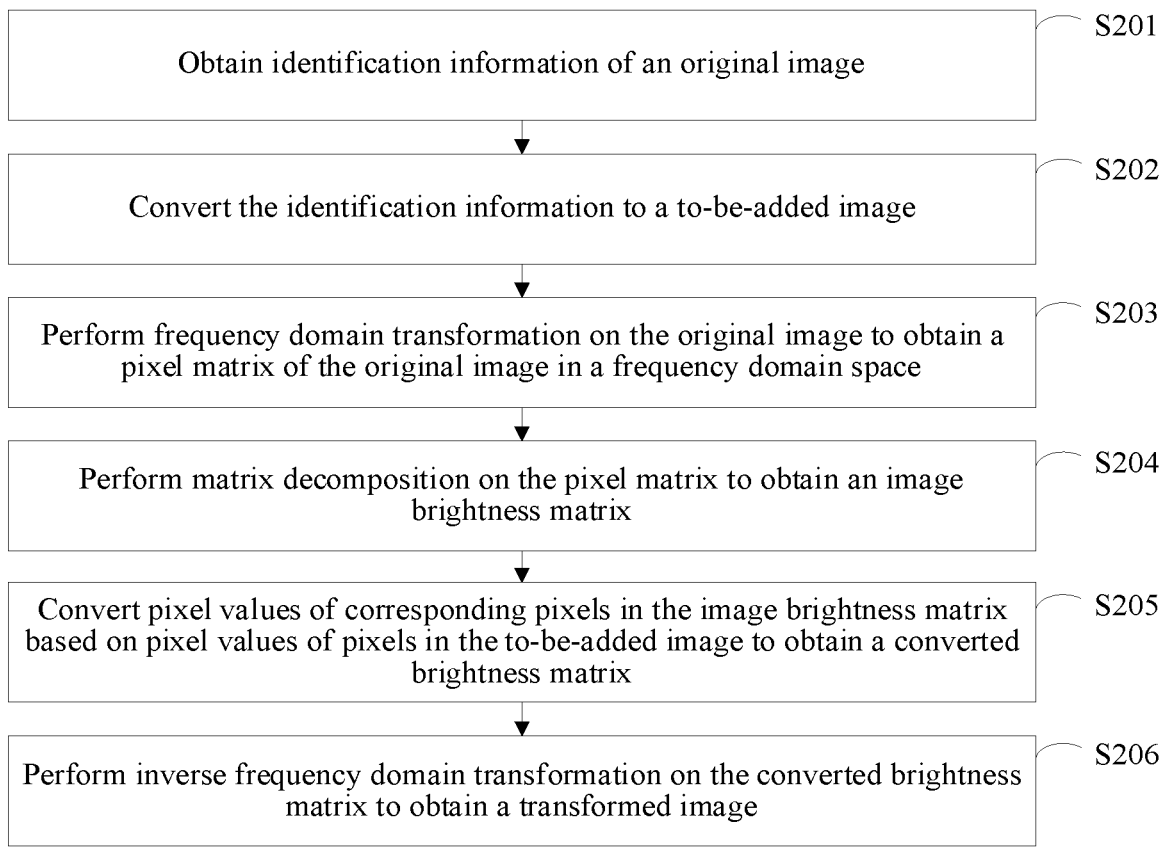
FIG. 2 is a schematic flowchart of an image transformation method according to an embodiment of the disclosure.

An embodiment of the disclosure provides an image transformation method. The method may be performed by a processor of a computer device (the first terminal shown in FIG. 1). FIG. 2 is a schematic flowchart of an image transformation method according to an embodiment of the disclosure. As shown in FIG. 2, an illustrative process of the image transformation method may include operations S201-S206, which are as follows.

S201. Obtain identification information of an original image.

The original image may be an image to which identification information needs to be added, may further be a video image frame clipped from a video to which identification information needs to be added, and the like.

The identification information may be an identifier for representing source information of the image, and feature information of the image may be obtained through the identification information. The identification information may be user identification information, for example, the identification information may be user account information of a user that posts the image, or the like. The feature information of the image may be obtained through the identification information. The feature information of the image may include a source and contents of the image, such as a platform, a title, contents, an author of the posted image, and the like. For example, the feature information of the image may be obtained from a feature information database through the identification information.

There are many methods to obtain the original image. For example, the original image may be obtained from a local storage, a network side device, or the like. For example, the original image may be obtained from a local album.

In an embodiment, the original image may also be obtained from an original video. For example, the original video may be obtained from a local storage, a network side device, or a photographing device. Since the original video includes plurality of video image frames, one of the video image frames may be clipped from the original video as the original image, and the like.

In some embodiments, after the original image is obtained, the identification information of the original image may further be obtained. For example, after the terminal obtains the original image uploaded by the user, unique identification information (such as an image ID) corresponding to the original image may be generated according to the original image, and then the feature information of the image such as the title, contents, the author, and the posting platform corresponding to the image ID may further be stored in the feature information database to facilitate the search for the feature information corresponding to the original image identification information.

In an embodiment, when the original image is a video image frame in the original video, the identification information of the original video may further be obtained, and the identification information corresponding to the original video may be used as the identification information of the original image. For example, after the terminal obtains the original video uploaded by the user, unique identification information (such as a video ID) corresponding to the original video may be generated according to the uploaded original video, and the video ID and feature information such as a video title, contents, the author, and the posting platform corresponding to the video ID may further be stored in the feature information database to facilitate the search for the feature information corresponding to the video identification information.

In an embodiment, the identification information may not only be an image ID or a video ID, but include any other form of an identifier as long as the identifier of the original image feature information may be uniquely queried. For example, the identification information may alternatively be an identifier related to the posting platform of the original image, may alternatively be an identifier related to the author of the original image, or the like.

S202. Convert the identification information to a to-be-added image (or an identification image).

The identification image may be an image that needs to be added to the original image, and may be an image including information such as identification information. For example, the identification image may be an image including a video ID.

In the embodiments of the disclosure, the identification image may be embedded into the original image, so as to add invisible identification information to the original image.

In some embodiments, for example, when the identification information is a video ID, the video ID may be in the form of a character string, and the character string representing the video ID may be converted to an identification image. The identification image may include identification information.

In an embodiment, the form of the identification image may further be the form of a watermark.

Watermarking may refer to a method for hiding high-security-level information into low-security-level multimedia for public transfer through an insecure channel to implement covert communication. The identification information may be an object to be protected by the covert communication, the original image may be a host provider of the identification information, and both the identification information and the original image may be any form of digital information such as a character string, texts, an image, an audio, a video, and the like.

In an embodiment, in order to facilitate the addition of identification information, a character-pixel mapping set may further be use to implement conversion between the identification information and the identification image. Specifically, the operation of "converting the identification information to the identification image" may include:

obtaining a character-pixel mapping set including a relationship between a character and pixel points;

obtaining the pixel points corresponding to the character in the identification information based on the character-pixel mapping set; and generating the identification image based on the pixel points corresponding to the character.

The character-pixel mapping set may be a mapping set including the relationship between the character and the pixel points. For example, the character-pixel mapping set may be a character dot matrix library. The character may be decomposed into a pixel point array through the character-pixel mapping set. The pixel point array includes a plurality of pixel points. For example, the pixel point array includes 16×16 pixels or 24×24 pixels, and an outline of the character is represented through definition of each pixel point, so as to convert the character into the corresponding pixel points.

The identification information may include characters. For example, the identification information may include a character string that may represent the source of the original image, for example, the identification information may be a character string of a video ID, and the like. A character string may include one or more characters.

In some embodiments, the character-pixel mapping set may be obtained, the pixel points corresponding to the character in the identification information are obtained based on the character-pixel mapping set, and then the identification image is generated based on the pixel points corresponding to the character. For example, when the identification information includes a character string of a video ID, a character-pixel mapping set may be loaded. The character-pixel mapping set may be a character dot matrix library, a character dot matrix of each character c in the character string of the video ID is queried to obtain a character dot matrix array Arr(c) corresponding to a character c, then the character dot matrix arrays corresponding to all of the characters in the character string of the video ID are spliced together to obtain the character dot matrix array Ar[id] corresponding to the character string of the video ID, and then the character dot matrix array Ar[id] is converted to the identification image.

In an embodiment, the pixel points corresponding to the character may further be binarized to facilitate identification of information in the image, thereby reducing an amount of data in the image and improving the efficiency of image identification. Specifically, the operation of "generating the identification image based on the pixel points corresponding to the character" may include:

binarizing the pixel points corresponding to the character to obtain a binary image; and performing image scrambling on the binary image to obtain the identification image.

Binarization may be a process of setting a gray value of the pixel points on the image to 0 or 255 to cause the entire image to present an obvious black and white effect.

Image scrambling may be a technology that scrambles the order of information in an image to transform the image into a messy and unrecognizable image. The image scrambling method may be reversible or periodic. When the image scrambling operation is repeated several times, an image before the image scrambling is to be obtained. There are a plurality of image scrambling methods. For example, the image scrambling method may include Arnold transformation (cat face transformation), Fibonacci transformation, Hilbert curvilinear transformation, E-curve transformation, Gray transformation, affine transformation, and the like.

In some embodiments, the pixel points corresponding to the character may be binarized to obtain a binary image, and then image scrambling is performed on the binary image to obtain the identification image. For example, an element whose value is 1 in the pixel points corresponding to the character is changed to 0 (black pixel points), and an element whose value is 0 in the pixel points corresponding to the character is changed to 255 (white pixel points), so as to binarize the pixel points corresponding to the character to obtain a binary image with a fixed size. The binary image includes the character string of the video ID. Then image scrambling is performed on the binary image to obtain the identification image.

In an embodiment, the image may further be encrypted by scrambling the image to enhance the security of watermarking in the original image. Specifically, the operation of "performing image scrambling on the binary image to obtain the identification image" may include:

determining a transformation key for image scrambling;

obtaining an image scrambling mapping set based on the transformation key, the image scrambling mapping set including a relationship between pre-image scrambling pixel points and post-image scrambling pixel points; and performing mapping transformation on the pixel points in the binary image based on the image scrambling mapping set to obtain the identification image.

The transformation key may be a parameter inputted into an algorithm for converting plaintext to ciphertext or ciphertext to plaintext, and the mapping relationship between elements before and after the transformation may be determined by transforming the key.

In some embodiments, the transformation key for image scrambling may be determined, and the image scrambling mapping set may be obtained based on the transformation key. The image scrambling mapping set includes a relationship between pre-image scrambling pixel points and post-image scrambling pixel points, and then mapping transformation are performed on the pixel points in the binary image based on the image scrambling mapping set to obtain the identification image. For example, the binary image may be transformed into an identification image by using the Arnold image scrambling mapping formula.

Arnold transformation may be a transformation process in which elements in a discretized digital image matrix are rearranged through methods such as stretching, compression, folding, splicing, and the like. Arnold transformation is a process of re-cutting and splicing. The pixel points of the image matrix are rearranged through Arnold transformation. The Arnold transformation is reversible and periodic. When the Arnold transformation operation is repeated for several operations, the image before the transformation is to be obtained.

For example, (x, y) may represent coordinates of the pixel points in the binary image, and (x', y') may represent coordinates of the pixel points in the identification image. k represents a number of transformations, a and b represent transformation matrix parameters, and k, a, and b may be used as transformation keys, for example, key={k=32, a=2, b=7} may be used as a set of transformation keys. For an N×N image, the Arnold image scrambling mapping formula may be as follows:

$$\begin{bmatrix} x' \\ y' \end{bmatrix} = \begin{bmatrix} 1 & a \\ b & ab+1 \end{bmatrix} \begin{bmatrix} x \\ y \end{bmatrix} \bmod(N) \quad x, y \in \{0, 1, 2, \ldots, N-1\}$$

The Arnold image scrambling mapping formula may be determined through the transformation keys, and mapping transformation are performed on the pixel points in the binary image through the image scrambling mapping formula to obtain the pixel points in the identification image, thereby obtaining the identification image. Through mapping transformation of a set of discrete pixel points, the images may be changed from being orderly to unordered. When image scrambling transformation is performed on all of the pixel points in the binary image, the identification image may be generated.

In an embodiment, there may be a plurality of image scrambling methods for performing image scrambling on the binary image to obtain the identification image. For example, the image scrambling method may include Arnold transformation (cat face transformation), Fibonacci transformation, Hilbert curvilinear transformation, E-curve transformation, Gray transformation, affine transformation, and the like.

S203. Perform frequency domain transformation on the original image to obtain a pixel matrix of the original image in a frequency domain space.

The frequency domain transformation may be a transformation that transforms a complex time signal or a spatial signal into a structural form represented by frequency components. There may be a plurality of methods for frequency domain transformation, for example, discrete wavelet transform, discrete cosine transform, fast Fourier transform, and the like.

In some embodiments, frequency domain transformation may be performed on the original image to obtain the pixel matrix of the original image in the frequency domain space. For example, wavelet transform may be performed on the original image to obtain the pixel matrix of the original image in the frequency domain space.

The wavelet transform may be stepwise multi-scale refinement for signals or functions through a dilation and translation operation, so as to finally achieve time subdivision at a high frequency and frequency subdivision at a low frequency, which may automatically adapt to requirements for time-frequency signal analysis, so as to focus on any detail of the signal. Wavelet transform may fully highlight features of certain aspects of the problem, and may perform localization analysis in time or space frequency.

In an embodiment, the identification information may be added to the original image through frequency domain transformation, which may enhance the concealment and the degree of resistance of watermarks to attacks. Specifically, the operation of "performing frequency domain transformation on the original image to obtain the pixel matrix of the original image in the frequency domain space" may include:

performing the frequency domain transformation on the original image to obtain a plurality of candidate pixel matrices of the original image in the frequency domain space; and selecting the pixel matrix of the original image in the frequency domain space from the plurality of candidate pixel matrices based on frequencies of the candidate pixel matrices.

In some embodiments, frequency domain transformation may be performed on the original image to obtain a plurality of candidate pixel matrices of the original image in the frequency domain space, and then a pixel matrix of the original image in the frequency domain space is selected from the plurality of candidate pixel matrices based on frequencies of the candidate pixel matrices. For example, three-level discrete wavelet transform may be performed on the original image to obtain ten frequency domain sub-bands: LL3, LH3, HL3, HH3, LH2, HL2, HH2, LH1, HL1, and HH1. Then, the frequency domain sub-band LL3 is determined as the pixel matrix of the original image in the frequency domain space according to the frequency of the frequency domain sub-band.

For example, first-level wavelet decomposition transformation may be first performed on the original image to obtain four first-level frequency domain sub-bands. The four first-level frequency domain sub-bands include a low-frequency sub-band LL1 and three high-frequency sub-bands LH1, HL1, and HH1. Since most energy of the image is concentrated in the low-frequency sub-band LL1, second-level wavelet decomposition transformation may be performed on the low-frequency sub-band LL1 to obtain second-level frequency domain sub-bands LL2, LH2, HL2, and HH2. Then third-level wavelet decomposition transformation is performed on the low-frequency sub-band LL2 to obtain third-level frequency domain sub-bands LL3, LH3, HL3, and HH3. Therefore, ten frequency domain sub-bands are obtained in total: LL3, LH3, HL3, HH3, LH2, HL2, HH2, LH1, HL1, and HH1. Then the frequency domain sub-band LL3 may be determined as the pixel matrix of the original image in the frequency domain space according to the frequency of the frequency domain sub-band. Wavelet transform is a digital watermarking algorithm. The wavelet transform may make a digital watermark more concealed, imperceptible by naked eyes, and strongly robust, thereby improving the security of the watermark.

In an embodiment, the method for frequency domain transformation may further be selected from discrete wavelet transform, discrete cosine transform, fast Fourier transform, and the like as required. The method for frequency domain transformation may further be a combination of a plurality of transformation methods, for example, first performing discrete wavelet transform and then discrete cosine transform, and the like.

S204. Perform matrix decomposition on the pixel matrix to obtain an image brightness matrix.

The matrix decomposition may be a method for disassembling a matrix into a plurality of matrix products. There may be a plurality of matrix decomposition methods such as triangular decomposition, full rank decomposition, QR (orthogonal triangular) decomposition, Jordan decomposition, singular value decomposition, and the like.

In some embodiments, matrix decomposition may be performed on the pixel matrix to obtain the image brightness matrix. For example, singular value decomposition may be performed on the pixel matrix to obtain the image brightness matrix.

The singular value decomposition is a decomposition method in which a complex matrix is represented through multiplication of a few simple sub-matrices, and the sub-matrices may include characteristics of the complex matrix. Singular value decomposition is a matrix decomposition method. Each grayscale image f(x, y) is actually a two-dimensional matrix including non-negative scalars. For example, $I \in R^{M \times N}$ may represent a matrix of a grayscale image. R may represent a real number field, a size of the grayscale image matrix I is M×N, and then the singular value decomposition formula of the image matrix I may be as follows:

$$I = U \Sigma V^T$$

$U \in R^{M \times N}$ and $V \in R^{M \times N}$ are both orthogonal matrices, elements on the off-diagonal line of the matrix $\Sigma \in R^{M \times N}$ are all 0, and the elements on the diagonal line of the matrix $\Sigma \in R^{M \times N}$ satisfy the following relationship:

$$\sigma_1 \geq \sigma_2 \geq \ldots \geq \sigma_r \geq \sigma_{r+1} = \ldots = \sigma_M = 0$$

r is a rank of the image matrix I, and the rank is equal to a number of non-negative singular values. $\sigma_i$ is a singular value of the image matrix I and a square root of a matrix eigenvalue $II^T$.

In an embodiment, singular value decomposition may be performed on the pixel matrix to obtain the image brightness matrix. For example, singular value decomposition may be performed on the pixel matrix LL3, LL3=$USV^T$, to obtain three matrices, and the singular value matrix S may be used as the image brightness matrix.

Since the singular value in the image matrix represents the image brightness feature, geometric characteristics of the image may be represented by singular vectors, and stability of the singular value of the image matrix is good, when little disturbance is applied to the image, the singular value of the image matrix changes little. Therefore, embedding a watermark in the singular value of the image matrix may improve the robustness of the watermark. In addition, since the singular value represents inherent characteristics of the image rather than visual characteristics, the singular value may not generate great visual changes, so as to ensure the invisibility of the watermark.

S205. Convert pixel values of corresponding pixels in the image brightness matrix based on pixel values of pixels in the identification image to obtain a converted brightness matrix.

In some embodiments, the pixel values of the corresponding pixels in the image brightness matrix may be converted based on the pixel values of the pixels in the identification image to obtain the converted brightness matrix. For example, since there are only two cases (that is, 0 and 1) for the pixel value in the identification image, the singular value of the corresponding pixels in the image brightness matrix may be converted based on the pixel values of the pixels in the identification image to obtain the converted matrix.

In one embodiment, the watermark may be embedded by converting the pixel value of the image embedding bit in the identification image, thereby dispersing the energy of the watermark signal to all or part of the carrier frequency band, so as to improve the robustness and fidelity of the watermark. Specifically, the operation of "converting the pixel values of the corresponding pixels in the image brightness matrix based on the pixel values of the pixels in the identification image to obtain the converted brightness matrix" may include:

determining an image embedding bit in the identification image;

obtaining a pixel value of the image embedding bit in the identification image; and converting a pixel value of an image embedding bit in the image brightness matrix based on the pixel value of the image embedding bit in the identification image to obtain the converted brightness matrix.

In some embodiments, the image embedding bit in the identification image may be determined, the pixel value of the image embedding bit in the identification image may be obtained, and then the pixel value of the image embedding bit in the image brightness matrix is converted based on the pixel value of the image embedding bit in the identification image to obtain the converted brightness matrix. For example, the pixel value may be converted through the method of quantization embedding. Since there are only two cases for the pixel value in the identification image, two different quantization embedding methods may be used: a quantization embedding method A and a quantization embedding method B. When information of the image embedding bit in the identification image is 0, the quantization embedding method A may be used to quantize the singular value in the image brightness matrix, and when information of the image embedding bit in the identification image is 1, the quantization embedding method B may be used to quantize the singular value in the image brightness matrix, so that two sets of different quantized data may be obtained.

During the quantization, in the quantization embedding method, data closest to the original data is selected instead of the original data, so as to ensure imperceptibility, that is, fidelity, of the watermark. In addition, the data between the two quantization embedding methods does not overlap, so that discontinuity of different watermark data may be ensured, and the watermark has certain robustness.

In an embodiment, intensity of the watermark may further be adjusted by using an embedding factor to improve flexibility of watermarking. Specifically, the operation of "converting the pixel value of the image embedding bit in the image brightness matrix based on the pixel value of the image embedding bit in the identification image to obtain the converted brightness matrix" may include:

determining an embedding intensity factor;

determining a pixel adjustment range based on the embedding intensity factor and the pixel value of the image embedding bit in the identification image; and converting the pixel value of the image embedding bit in the image brightness matrix based on the pixel adjustment range to obtain the converted brightness matrix.

The embedding intensity factor may be information for adjusting the intensity of the watermark. A larger value of the embedding intensity factor leads to stronger robustness of the watermark, and a smaller value of the embedding intensity factor leads to better invisibility of the watermark.

In some embodiments, the embedding intensity factor may be determined, the pixel adjustment range is determined based on the embedding intensity factor and the pixel value of the image embedding bit in the identification image, and then the pixel value of the image embedding bit in the image brightness matrix is converted based on the pixel adjustment range to obtain the converted brightness matrix. For example, Q may represent the embedding intensity factor, $Z=\mathrm{mod}(\sigma_1, Q)$ is defined as a remainder operation, and W represents the pixel value of the image embedding bit in the identification image. The pixel adjustment range is obtained. The pixel adjustment range may be expressed by a pixel conversion formula, the singular value $\sigma_1$ in the image brightness matrix may be selected for conversion, and the pixel conversion formula may be as follows:

When $$w = 1, \quad \begin{array}{ll} \sigma'_1 = \sigma_1 - Z - \frac{Q}{4} & Z < \frac{Q}{4} \\ \sigma'_1 = \sigma_1 - Z + \frac{3Q}{4} & Z \geq \frac{Q}{4} \end{array}$$

When $$w = 0, \quad \begin{array}{ll} \sigma'_1 = \sigma_1 - Z + \frac{Q}{4} & Z < \frac{3Q}{4} \\ \sigma'_1 = \sigma_1 - Z + \frac{5Q}{4} & Z \geq \frac{3Q}{4} \end{array}$$

The singular value in the image brightness matrix S may be converted according to the pixel adjustment range to obtain the converted brightness matrix S'.

S206. Perform inverse frequency domain transformation on the converted brightness matrix to obtain a transformed image.

In some embodiments, inverse frequency domain transformation is performed on the converted brightness matrix to obtain the transformed image including invisible identification information. For example, three-level discrete wavelet inverse transformation may be performed on the converted brightness matrix to obtain a transformed image including invisible identification information.

In an embodiment, the transformed image to which the identification information is added may be obtained through inverse transformation, and the added identification information is imperceptible, thereby having no effect on the quality of the transformed image. Specifically, the operation of "performing inverse frequency domain transformation on the converted brightness matrix to obtain the transformed image" may include:

performing inverse matrix decomposition on the converted brightness matrix to obtain an embedded matrix; and performing inverse frequency domain transformation on the embedded matrix to obtain the transformed image.

In some embodiments, inverse matrix decomposition may be performed on the converted brightness matrix to obtain the embedded matrix, and inverse frequency domain transformation is performed on the embedded matrix to obtain the transformed image including the invisible identification information. For example, inverse singular value decomposition may be performed on the converted brightness matrix S', $LL3' = US'V^T$, to obtain the embedded matrix LL3', and then the three-level inverse discrete wavelet transformation is performed on the embedded matrix to obtain the transformed image.

In an embodiment, after the transformed image is obtained, the original image may further be replaced with the transformed image. For example, each video image frame in the original video may be used as the original image, and the identification information is added by using the same method.

Figure 7:
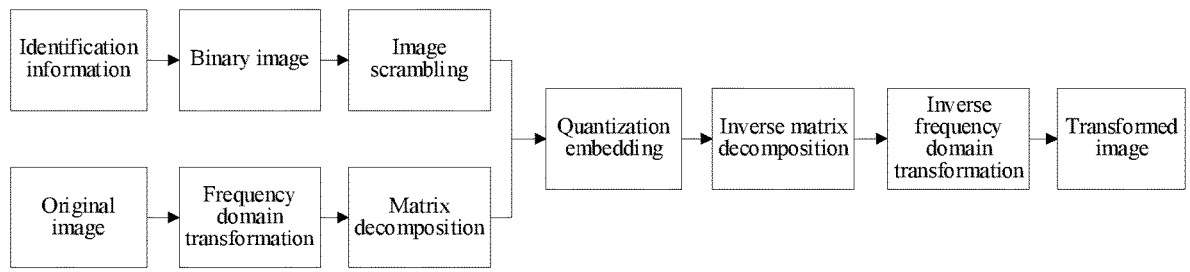
FIG. 7 is a flowchart of identification information addition according to an embodiment of the disclosure.

FIG. 7 is a flowchart of identification information addition according to an embodiment of the disclosure. As shown in FIG. 7, in the image transformation method, controllable characteristics of video production and distribution stages may be used to obtain a binary image by binarizing feature images of the video, and then image scrambling is performed on the binary image to obtain the identification image. Frequency domain transformation is performed on the original image in the video to obtain a pixel matrix, and singular value decomposition is performed on the pixel matrix to obtain an image brightness matrix. Then the identification image is embedded in the image brightness matrix in a quantization embedding manner to obtain a converted brightness matrix, then inverse singular value decomposition is performed on the converted brightness matrix to obtain the embedded matrix, and then inverse frequency domain transformation is performed on the embedded matrix to obtain the transformed image, so that imperceptible and highly robust feature watermark information is embedded in the video image of the video.

As described above, according to the embodiments of the disclosure, identification information of an original image may be obtained, the identification information is converted to an identification image, frequency domain transformation is performed on the original image to obtain a pixel matrix of the original image in a frequency domain space, matrix decomposition is performed on the pixel matrix to obtain an image brightness matrix, pixel values of corresponding pixels in the image brightness matrix are converted based on pixel values of pixels in the identification image to obtain a converted brightness matrix, and inverse frequency domain transformation is performed on the converted brightness matrix to obtain a transformed image. The transformed image includes the invisible identification information. The invisible identification information is added to the original image. When other users need to obtain the identification information of the original image, the identification information of the original image needs to be recognized from the transformed image through information recognition technologies, thereby improving information security. In addition, since the added identification information is imperceptible, quality of the original image is not affected. The added identification information has high robustness, which means that even if the original image undergoes processing such as cropping, rotation, re-recording, compression, re-encoding, transmission interference, and the like, integrity of the identification information may be well maintained.

Figure 3:
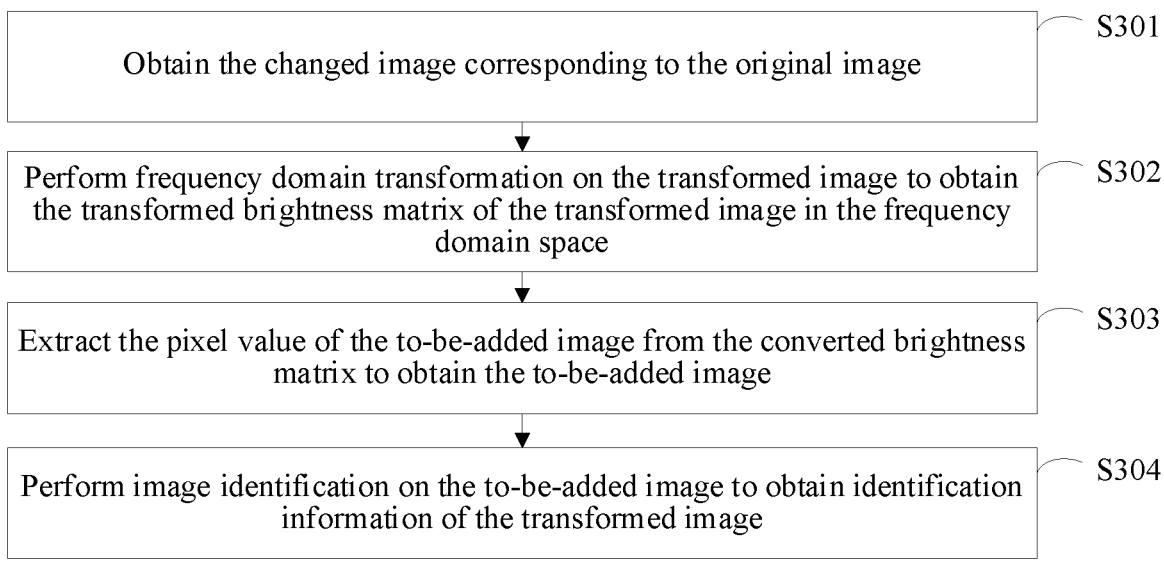
FIG. 3 is a schematic flowchart of an image transformation method according to an embodiment of the disclosure.

An image transformation method provided by an embodiment of the disclosure may be performed by a processor of a computer device (e.g., the second terminal in FIG. 1). FIG. 3 is a schematic flowchart of an image transformation method according to an embodiment of the disclosure. As shown in FIG. 3, an illustrative process of the image transformation method may include operations S301-S304, which are as follows.

S301. Obtain a transformed image corresponding to an original image.

The transformed image may be an image on which identification information recognition needs to be performed, and may be generated by using the solution described in the embodiment shown in FIG. 2, which includes invisible identification information (to which invisible identification information is added).

In some embodiments, there are a plurality of methods for obtaining the transformed image. For example, in case of an image with a watermark, the image itself may be used as a transformed image to extract the watermark. In case of a video with a watermark, since each video image frame in the video is watermarked in the same way, in order to reduce an amount of processing, a plurality of video images may be extracted from the video at specified intervals as transformed images instead of obtaining each video image frame.

In an embodiment, in order to improve accuracy of the determination result, each video image frame in the video may further be used as the transformed image.

S302. Perform frequency domain transformation on the transformed image to obtain a converted brightness matrix of the transformed image in a frequency domain space.

In some embodiments, frequency domain transformation may be performed on the transformed image to obtain an embedded matrix; and matrix decomposition is performed on the embedded matrix to obtain the converted brightness matrix of the transformed image in the frequency domain space. For example, a three-level discrete wavelet transformation may be performed on the transformed image to obtain ten frequency domain sub-bands: LL3', LH3', HL3', HH3', LH2', HL2', HH2', LH1', HL1', and HH1'. LL3' is obtained from ten frequency domain sub-bands as an embedded matrix, and singular value decomposition is performed on the embedded matrix LL3', LL3'=US'V$^T$, to obtain the converted brightness matrix S' of the transformed image in the frequency domain space.

S303. Extract a pixel value of a to-be-added image (or identification image) from the converted brightness matrix to obtain the identification image.

In some embodiments, the pixel value of the identification image may be extracted from the converted brightness matrix to obtain the identification image. For example, the pixel value of the identification image may be extracted from the converted brightness matrix S' according to the corresponding inverse transformation of the above quantization embedding method to obtain the identification image.

In an embodiment, this operation may include the following sub-operations: determining an image embedding bit in the converted brightness matrix; obtaining a pixel value of the image embedding bit in the converted brightness matrix; and determining the pixel value of the identification image based on the pixel value of the image embedding bit in the converted brightness matrix to obtain the identification image. For example, after the pixel value of the image embedding bit in the converted brightness matrix is obtained, the pixel value of the identification image may be determined according to the corresponding inverse transformation of the above quantization embedding method.

S304. Perform image identification on the identification image to obtain identification information of the transformed image (or the identification information of the original image).

In some embodiments, image identification may be performed on the identification image to obtain the identification information of the transformed image. In an embodiment, the identification information includes a character, and this operation may include the following sub-operations: obtaining a character-pixel mapping set; obtaining the character corresponding to pixel points in the identification image based on the character-pixel mapping set; and determining the identification information of the transformed image based on the character corresponding to the pixel points in the identification image.

For example, inverse image scrambling transformation may be performed on the identification image to obtain a binary image, and then image identification is performed on the binary image based on the character-pixel mapping set to obtain the character corresponding to the pixel points in the identification image, thereby obtaining the identification information of the transformed image.

In an embodiment, the performing inverse image scrambling transformation on the identification image to obtain a binary image includes: determining a transformation key for image scrambling; obtaining an image scrambling mapping set based on the transformation key; and performing mapping transformation on the pixel points in the identification image based on the image scrambling mapping set to obtain the binary image.

In an embodiment, for example, inverse Arnold transformation may be performed on the identification image to obtain the binary image. (x, y) may represent coordinates of pixel points in the binary image, and (x', y') represents coordinates of the pixel points in the identification image. k represents a number of transformations, a and b represent transformation matrix parameters, and k, a, and b may be used as transformation keys, for example, key={k=32, a=2, b=7} may be used as a set of transformation keys. For an N×N image, the mapping formula of the inverse Arnold transformation may be as follows:

$$\begin{bmatrix} x \\ y \end{bmatrix} = \begin{bmatrix} ab+1 & -a \\ -b & 1 \end{bmatrix} \begin{bmatrix} x' \\ y' \end{bmatrix} \mod(N) \quad x, y \in \{0, 1, 2, \ldots, N-1\}$$

Inverse Arnold transformation may be performed on the identification image through the mapping formula of inverse Arnold transformation to obtain the binary image.

In an embodiment, image identification may be performed on the binary image by using a method of optical character recognition (OCR) to obtain the identification information of the transformed image.

The OCR may be a recognition method in which an image is converted to transform all of information, texts, and the like in the image into computer characters, so that storage contents of image data are reduced, and the recognized computer characters may be reused and analyzed, thus saving manpower and time consumed by keyboard input.

In an embodiment, after the identification information of the transformed image is obtained, the identification information may further be retrieved from a feature information database (refer to FIG. 9) to obtain feature information of the original image, such as the title, contents, the author, the posting platform, and the like corresponding to the original image.

Figure 8:
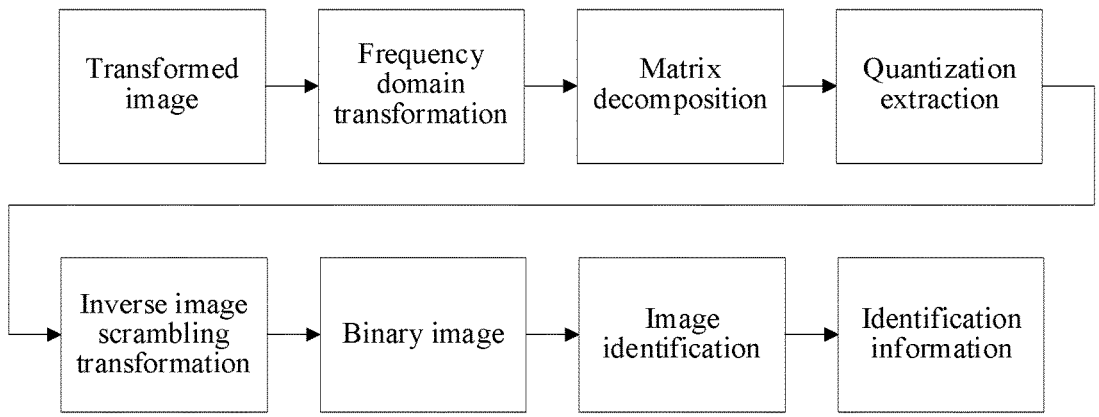
FIG. 8 is a flowchart of identification information extraction according to an embodiment of the disclosure.

Through the above image transformation method, the video information may be recognized. FIG. 8 is a flowchart of identification information extraction according to an embodiment of the disclosure. As shown in FIG. 8, when a video or a screenshot of the video is given, the transformed image in the video may be obtained without affecting the video quality. Frequency domain transformation is performed on the transformed image to obtain the embedded matrix, and the singular value decomposition is performed on the embedded matrix to obtain the converted brightness matrix. The identification image is obtained from the converted brightness matrix through quantization and extraction, and inverse image scrambling transformation is performed on the identification image to obtain the binary image. Image identification is performed on the binary image to obtain the identification information of the video with high reliability, and the feature information of the corresponding video is obtained by retrieving the feature information database, such as the title, contents, the author, the source, and the like of the video.

The recognition of the identification information by using the image transformation method has high efficiency, low costs, and strong applicability, and even for videos that have undergone cropping, rotation, re-recording, compression, re-encoding, transmission interference, and the like, or for only one video screenshot or re-photographed images, the identification information may be well recognized.

In an embodiment, the image transformation method may be applied to the field of short videos, which is used for querying, tracing the source, copyright protection, information hiding, and the like for short videos.

In an embodiment, the image transformation method may further be used between heterogeneous applications. For example, when the transformed image is played on a first application, the transformed image may further be shared to other applications, and users may view the transformed image through other applications. Then the identification information of the transformed image is obtained through the watermark extraction method in the image transformation method, so as to obtain the feature information such as the source and the author of the transformed image.

As described above, according to the embodiments of the disclosure, the transformed image including invisible identification information may be obtained, frequency domain transformation is performed on the transformed image to obtain a converted brightness matrix of the transformed image in a frequency domain space, the pixel value of the identification image is extracted from the converted brightness matrix to obtain the identification image, and image identification is performed on the identification image to obtain the identification information of the transformed image. The identification image may be extracted from the transformed image, and image identification is performed on the identification image to obtain the identification information of the transformed image, thereby improving information security.

According to the method described in the foregoing embodiments, the following further provides detailed description by using examples.

As shown in FIG. 1, this embodiment further provides an image transformation system. The image transformation system includes: a first terminal, a server, and a second terminal. The first terminal may add an identification image to the original image. The second terminal may perform watermark extraction on the transformed image to obtain identification information. The terminal 10 may be a mobile phone, a tablet computer, a notebook computer, a personal computer (PC), or the like. The first terminal may share the transformed image through the server, and the second terminal may obtain the transformed image shared by the first terminal through the server. The first terminal is connected to the server through a network, and the second terminal is also connected to the server through a network. The network further includes network entities such as a router, a gateway, and the like, which are not shown in the figure.

Figure 4:
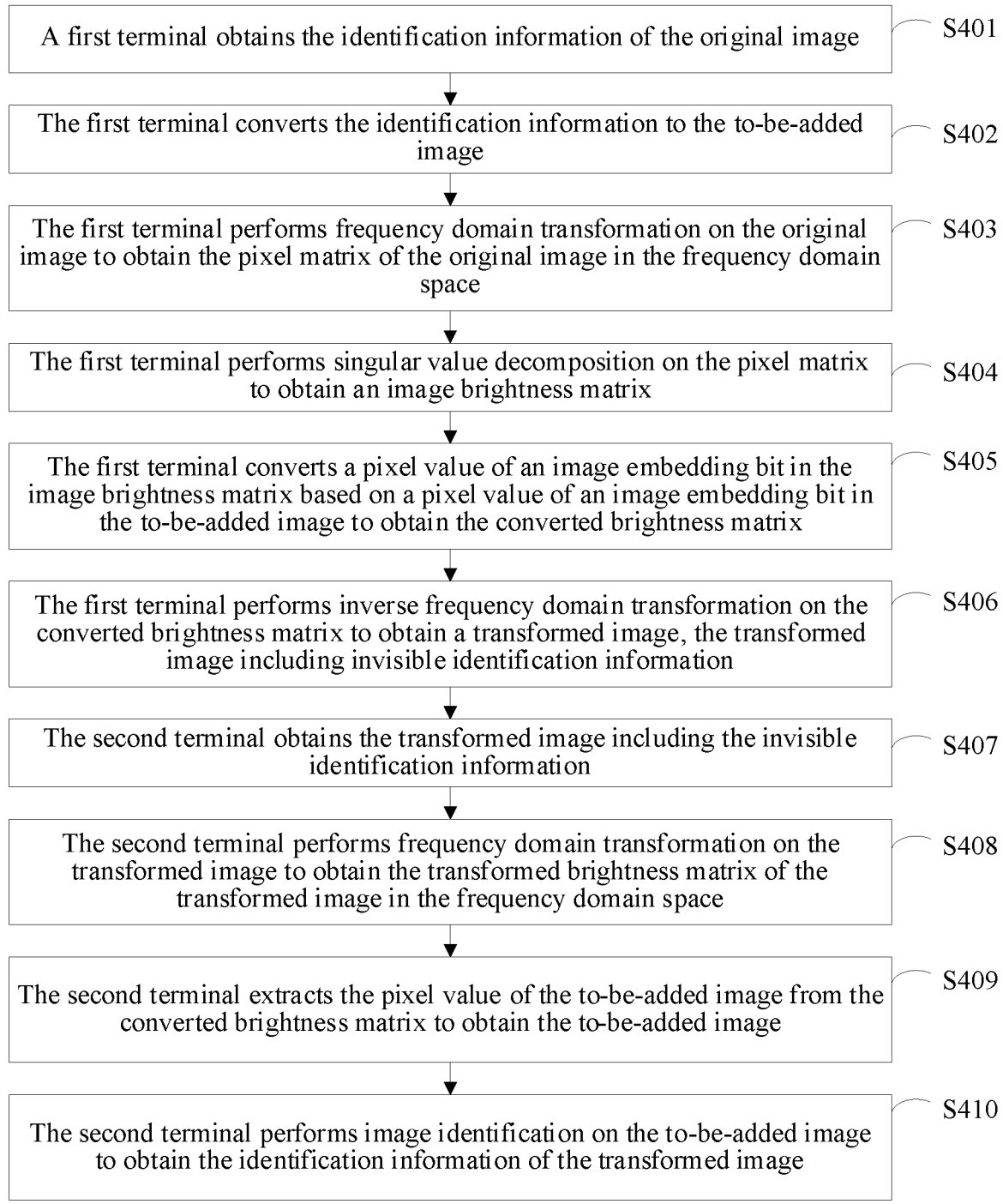
FIG. 4 is a schematic flowchart of an image transformation method according to an embodiment of the disclosure.
Figure 5:
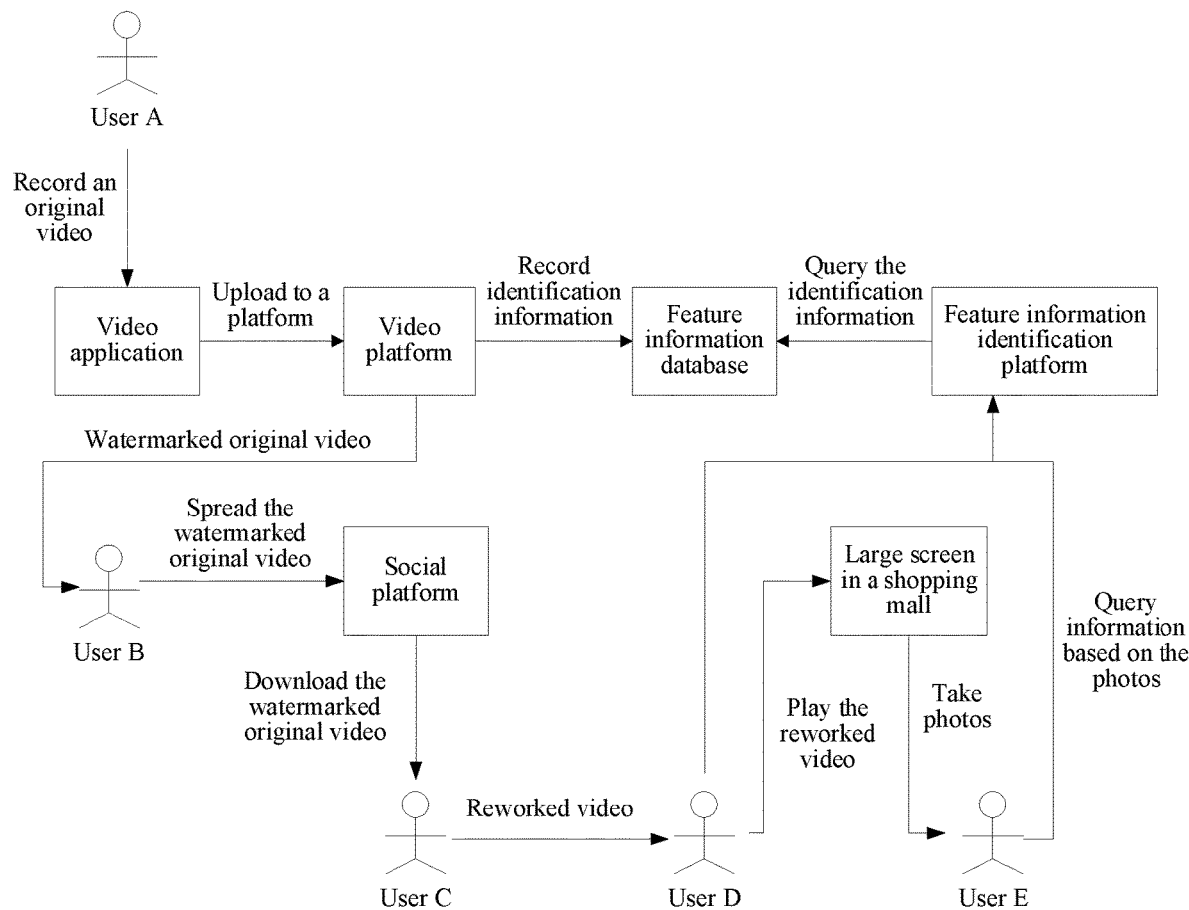
FIG. 5 is a schematic diagram of an application scenario according to an embodiment of the disclosure.
Figure 6:
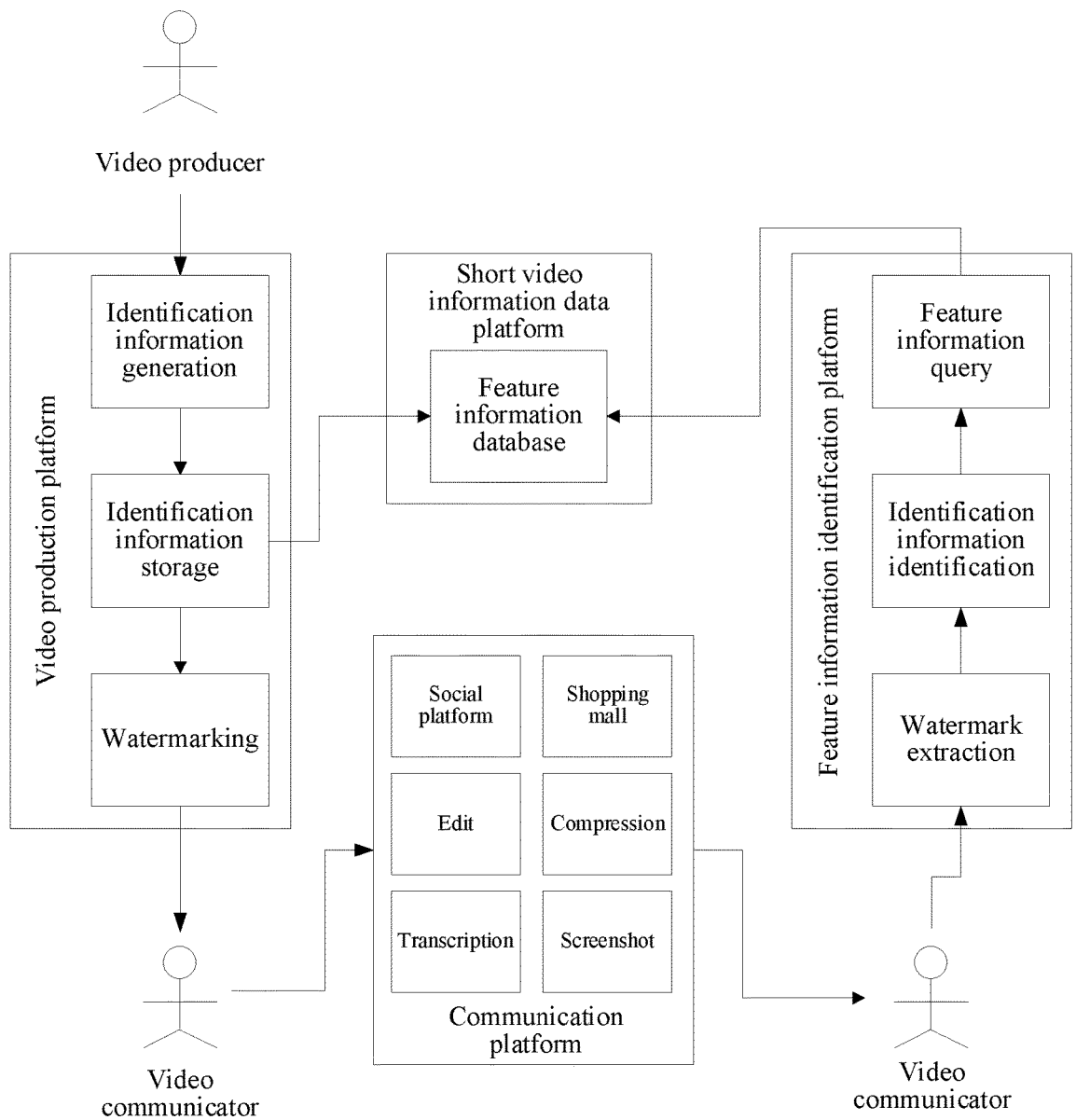
FIG. 6 is an overall architectural diagram according to an embodiment of the disclosure.

FIG. 4 is a schematic flowchart of an image transformation method according to an embodiment of the disclosure, FIG. 5 is a schematic diagram of an application scenario according to an embodiment of the disclosure, and FIG. 6 is an overall architectural diagram according to an embodiment of the disclosure. Referring to FIG. 4, an illustrative process of the image transformation method may include operations S401-S410, which are as follows:

S401. The first terminal obtains the identification information of the original image.

Since in the image transformation method, watermark information needs to be added to the original video in advance, the image transformation method may be applied to a video application scenario in which production and distribution stages of the original video are controllable.

In some embodiments, for example, as shown in FIG. 5, user A may record an original video, name the original video "My Lazy Time", and upload the video to the video application. The video application in the first terminal may obtain the original image to be watermarked in the original video and a video ID of the original video as identification information of the original image.

402. The first terminal converts the identification information to a to-be-added image (or identification image).

In some embodiments, for example, the first terminal may obtain a character dot matrix library, query a character dot matrix corresponding to each character in the identification information through the character dot matrix library, and then splice the character dot matrices corresponding to all characters together to obtain a character dot matrix array corresponding to the identification information. Then an element whose pixel value is 1 in the character dot matrix array is changed to 0 (black pixel points), and an element whose pixel value is 0 is changed to 255 (white pixel points) to obtain a binary image with a fixed size.

Then the transformation key for image scrambling may be determined, and an Arnold image scrambling mapping formula may be determined according to the transformation key. (x, y) represents coordinates of the pixel points in the binary image, and (x', y') represents coordinates of the pixel points in the identification image. k represents a number of transformations, a and b represent transformation matrix parameters, and k, a, and b may be used as transformation keys. For an N×N image, the Arnold image scrambling mapping formula may be as follows:

$$\begin{bmatrix} x' \\ y' \end{bmatrix} = \begin{bmatrix} 1 & a \\ b & ab+1 \end{bmatrix} \begin{bmatrix} x \\ y \end{bmatrix} \mod(N) \quad x, y \in \{0, 1, 2, \ldots, N-1\}$$

According to the image scrambling mapping formula, the binary image is transformed into the identification image.

S403. The first terminal performs frequency domain transformation on the original image to obtain a pixel matrix of the original image in the frequency domain space.

In some embodiments, for example, the first terminal may first perform first-level wavelet decomposition transformation on the original image to obtain four first-level frequency domain sub-bands. The four first-level frequency domain sub-bands include a low-frequency sub-band LL1 and three high-frequency sub-bands LH1, HL1, and HH1. Since most energy of the image is concentrated in the low-frequency sub-band LL1, second-level wavelet decomposition transformation may be performed on the low-frequency sub-band LL1 to obtain second-level frequency domain sub-bands LL2, LH2, HL2, and HH2. Then third-level wavelet decomposition transformation is performed on the low-frequency sub-band LL2 to obtain third-level frequency domain sub-bands LL3, LH3, HL3, and HH3. Therefore, ten frequency domain sub-bands are obtained in total: LL3, LH3, HL3, HH3, LH2, HL2, HH2, LH1, HL1, and HH1. Then the frequency domain sub-band LL3 may be determined as the pixel matrix of the original image in the frequency domain space according to the frequency of the frequency domain sub-band.

S404. The first terminal performs singular value decomposition on the pixel matrix to obtain an image brightness matrix.

In some embodiments, the first terminal may perform singular value decomposition on the pixel matrix LL3, LL3=$USV^T$, to obtain three matrices, and use the singular value matrix as an image brightness matrix S, and the image brightness matrix includes a plurality of singular values.

S405. The first terminal converts a pixel value of an image embedding bit in the image brightness matrix based on the pixel value of the image embedding bit in the identification image to obtain the converted brightness matrix.

In some embodiments, for example, the first terminal may convert the pixel values in the image brightness matrix through the method of quantization and embedding, determine the embedding intensity factor Q, define z=mod($\sigma_1$, Q) as a remainder operation, and determine the pixel adjustment range according to the embedding intensity factor. The pixel adjustment range may be expressed by a pixel conversion formula. Through the pixel conversion formula, the pixel value of the image embedding bit in the image brightness matrix S may be converted based on the pixel value W of the image embedding bit in the identification image to obtain the converted brightness matrix S'. The pixel conversion formula may be as follows:

When $$w=1, \begin{array}{ll} \sigma'_1=\sigma_1-Z-\frac{Q}{4} & Z<\frac{Q}{4} \\ \sigma'_1=\sigma_1-Z+\frac{3Q}{4} & Z\geq\frac{Q}{4} \end{array}$$

When $$w=0, \begin{array}{ll} \sigma'_1=\sigma_1-Z+\frac{Q}{4} & Z<\frac{3Q}{4} \\ \sigma'_1=\sigma_1-Z+\frac{5Q}{4} & Z\geq\frac{3Q}{4} \end{array}$$

S406. The first terminal performs inverse frequency domain transformation on the converted brightness matrix to obtain the transformed image, and the transformed image includes invisible identification information.

In some embodiments, for example, the first terminal may perform inverse singular value decomposition on the converted brightness matrix S', LL3'=$US'V^T$, to obtain the embedded matrix LL3', and then perform the three-level inverse discrete wavelet transformation on the embedded matrix LL3' to obtain the transformed image including the invisible identification information, and then the original image is replaced with the transformed image including the invisible identification information. Each video image frame in the original video is used as the original image, and the watermark is added by using the same method to obtain the watermarked original video.

For example, as shown in FIG. 5, after the first terminal in the video application completes the watermarking of the original video of the user A, a watermarked original video is obtained, and then the watermarked original video may be posted to the video application.

In an embodiment, as shown in FIG. 6, a video producer may obtain identification information of the original video through a video production platform, store feature information corresponding to the identification information in a feature information database, and add the watermark to the original video.

S407. The second terminal obtains the transformed image including the invisible identification information.

In some embodiments, the first terminal may share the transformed image including the invisible identification information to the second terminal through the server. For example, as shown in FIG. 5, user B may watch the watermarked original video in a video application, and may further share the watermarked original video. If user B wants to know the source and author information of the video, the second terminal of user B may perform the operation of extracting the watermark. The second terminal may extract a plurality of video images from the watermarked original video at specified intervals as transformed images including invisible identification information.

In an embodiment, as shown in FIG. 6, a video disseminator may edit, compress, transcribe, take a screenshot, and the like, and disseminate the video through social platforms, and the like. For example, as shown in FIG. 5, after obtaining the watermarked original video through a video application, the user B may further disseminate the watermarked original video through a social platform. User C may obtain the watermarked original video through the social platform, and perform video cropping, add advertisements, and the like for the watermarked original video to obtain a reworked video. User C may further share the reworked video with user D. After user D obtains the reworked video, the video may be played on a large screen of a shopping mall, and the like. After watching the reworked video on the large screen of the shopping mall, user E may use a photographing device to take a photo of the reworked video to obtain a captured photo.

S408. The second terminal performs frequency domain transformation on the transformed image to obtain the converted brightness matrix of the transformed image in the frequency domain space.

In some embodiments, for example, the second terminal may perform a three-level discrete wavelet transformation on the transformed image to obtain ten frequency domain sub-bands: LL3', LH3', HL3', HH3', LH2', HL2', HH2', LH1', HL1', and HH1'. LL3' is obtained from ten frequency domain sub-bands as an embedded matrix, and singular value decomposition is performed on the embedded matrix LL3', LL3'=$US'V^T$, to obtain the converted brightness matrix S' of the transformed image in the frequency domain space.

S409. The second terminal extracts the pixel value of the identification image from the converted brightness matrix to obtain the identification image.

In some embodiments, for example, the second terminal may extract the pixel value of the identification image from the converted brightness matrix S' according to the corresponding inverse transformation of the above quantization embedding method to obtain the identification image.

S410. The second terminal performs image identification on the identification image to obtain the identification information of the transformed image.

In some embodiments, for example, the second terminal may perform inverse Arnold transformation on the identification image to obtain the binary image. (x, y) may represent coordinates of pixel points in the binary image, and (x', y') represents coordinates of the pixel points in the identification image. k represents a number of transformations, a and b represent transformation matrix parameters, and k, a, and b may be used as transformation keys. For an N×N image, the mapping formula of the inverse Arnold transformation may be as follows:

$$\begin{bmatrix} x \\ y \end{bmatrix} = \begin{bmatrix} ab+1 & -a \\ -b & 1 \end{bmatrix} \begin{bmatrix} x' \\ y' \end{bmatrix} \mod(N) \quad x, y \in \{0, 1, 2, \ldots, N-1\}$$

Inverse Arnold transformation may be performed on the identification image by using the mapping formula of inverse Arnold transformation to obtain the binary image, image identification is performed on the binary image through OCR to obtain the identification information of the transformed image, and the identification information is retrieved from the feature information database, thereby obtaining feature information such as the title, contents, the author, a posting platform, and the like corresponding to the original image.

In an embodiment, the first terminal and the second terminal may further be the same terminal, that is, the same terminal performs the operations of adding and extracting the watermark.

In an embodiment, as shown in FIG. 6, the video disseminator may further extract identification information from the transformed image using the above method through a feature information recognition platform, and query the extracted identification information through the feature information database to obtain the feature information of the original video. For example, as shown in FIG. 5, user B may extract the identification information of the original video from the watermarked original video through the above method, user D may extract the identification information of the original video from the reworked video through the above method, and user E may extract the identification information of the original video from the captured photos through the above method, and query the feature information corresponding to the original video according to the identification information.

Figure 9:
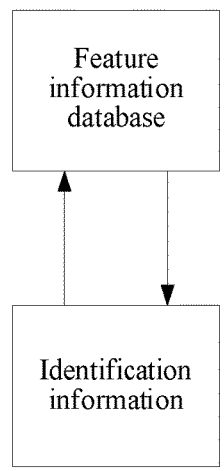
FIG. 9 is a flowchart of identification information retrieval according to embodiments of the disclosure.

FIG. 9 is a flowchart of identification information retrieval according to embodiments of the disclosure. In an embodiment, as shown in FIG. 9, feature information of the watermarked original video may further be queried through the feature information recognition platform. The feature information recognition platform may perform the operation of extracting the watermark to obtain the identification information of the original video. The feature information of the original video may be obtained from the feature information database according to the identification information, for example, the source, the author, the title, and the like of the original video.

As described above, according to the embodiments of the disclosure, identification information of an original image may be obtained through the first terminal, the identification information is converted to an identification image, frequency domain transformation is performed on the original image to obtain a pixel matrix of the original image in a frequency domain space, singular value decomposition is performed on the pixel matrix to obtain an image brightness matrix, a pixel value of an image embedding bit in the image brightness matrix is converted based on a pixel value of an image embedding bit in the identification image to obtain a converted brightness matrix, and inverse frequency domain transformation is performed on the converted brightness matrix to obtain a transformed image. The transformed image includes the invisible identification information. The transformed image including the invisible identification information is obtained through the second terminal, frequency domain transformation is performed on the transformed image to obtain a converted brightness matrix of the transformed image in a frequency domain space, the pixel value of the identification image is extracted from the converted brightness matrix to obtain the identification image, and image identification is performed on the identification image to obtain the identification information of the transformed image. The invisible identification information is added to the original image. When other users need to obtain the identification information of the original image, the identification information of the original image needs to be recognized from the transformed image including the invisible identification information through some information recognition technologies, thereby improving information security. In addition, since the added identification information is imperceptible, quality of the original image is not affected. The added identification information has high robustness, which means that even if the original image undergoes processing such as cropping, rotation, re-recording, compression, re-encoding, transmission interference, and the like, integrity of the identification information may be well maintained.

Figure 10:
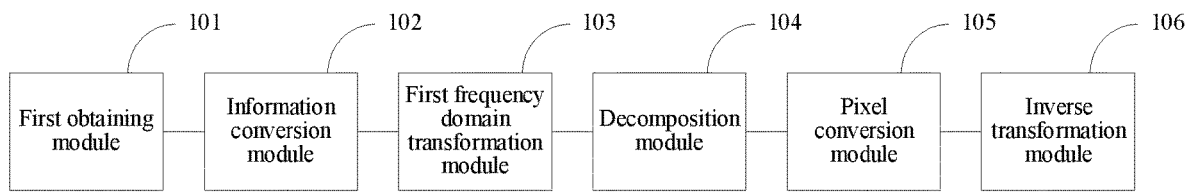
FIG. 10 is a schematic structural diagram of an image transformation apparatus according to an embodiment of the disclosure.

FIG. 10 is a schematic structural diagram of an image transformation apparatus according to an embodiment of the disclosure. The image transformation apparatus may be applicable to a computer device (such as a terminal or a server). As shown in FIG. 10, the image transformation apparatus may include: a first obtaining module 101, an information conversion module 102, a first frequency domain transformation module 103, a decomposition module 104, a pixel conversion module 105, and an inverse transformation module 106.

The first obtaining module 101 is configured to obtain identification information of an original image.

The information conversion module 102 is configured to convert the identification information to an identification image.

The first frequency domain transformation module 103 is configured to perform frequency domain transformation on the original image to obtain a pixel matrix of the original image in a frequency domain space.

The decomposition module 104 is configured to perform matrix decomposition on the pixel matrix to obtain an image brightness matrix.

The pixel conversion module 105 is configured to convert pixel values of corresponding pixels in the image brightness matrix based on pixel values of pixels in the identification image to obtain a converted brightness matrix.

The inverse transformation module 106 is configured to perform inverse frequency domain transformation on the converted brightness matrix to obtain a transformed image.

In an embodiment, the information conversion module 102 is configured to:
  obtain a character-pixel mapping set including a relationship between a character and pixel points;
  obtain the pixel points corresponding to the character in the identification information based on the character-pixel mapping set; and
  generate the identification image based on the pixel points corresponding to the character.

In an embodiment, the first frequency domain transformation module 103 may be configured to:
  perform frequency domain transformation on the original image to obtain a plurality of candidate pixel matrices of the original image in the frequency domain space; and
  select the pixel matrix of the original image in the frequency domain space from the plurality of candidate pixel matrices based on frequencies of the candidate pixel matrices.

In an embodiment, the pixel conversion module 105 may be configured to:
  determine an image embedding bit in the identification image;
  obtain a pixel value of the image embedding bit in the identification image; and
  convert a pixel value of an image embedding bit in the image brightness matrix based on the pixel value of the image embedding bit in the identification image to obtain the converted brightness matrix.

In an embodiment, the inverse transformation module 106 may be configured to:
  perform inverse matrix decomposition on the converted brightness matrix to obtain an embedded matrix; and
  perform inverse frequency domain transformation on the embedded matrix to obtain a transformed image, the transformed image including invisible identification information.

As described above, according to the embodiments of the disclosure, identification information of the original image may be obtained through the first obtaining module 101, the identification information is converted to the identification image through the information conversion module 102, frequency domain transformation is performed on the original image through the first frequency domain transformation module 103 to obtain the pixel matrix of the original image in the frequency domain space, matrix decomposition is performed on the pixel matrix through the decomposition module 104 to obtain the image brightness matrix, the pixel values of the corresponding pixels in the image brightness matrix are converted through the pixel conversion module 105 based on the pixel values of the pixels in the identification image to obtain the converted brightness matrix, and inverse frequency domain transformation is performed on the converted brightness matrix through inverse transformation module 106 to obtain the transformed image. The transformed image includes the invisible identification information. The invisible identification information is added to the original image. When other users need to obtain the identification information of the original image, the identification information of the original image needs to be recognized from the transformed image including the invisible identification information through some information recognition technologies, thereby improving information security. In addition, since the added identification information is imperceptible, quality of the original image is not affected. The added identification information has high robustness, which means that even if the original image undergoes processing such as cropping, rotation, re-recording, compression, re-encoding, transmission interference, and the like, integrity of the identification information may be well maintained.

Figure 11:
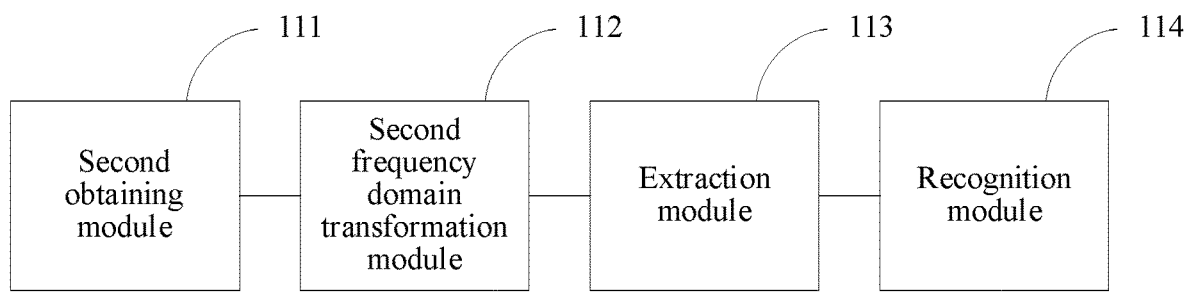
FIG. 11 is a schematic structural diagram of an image transformation apparatus according to an embodiment of the disclosure.

FIG. 11 is a schematic structural diagram of an image transformation apparatus according to an embodiment of the disclosure. The image transformation apparatus may be applicable to a computer device (such as a terminal or a server). As shown in FIG. 11, the image transformation apparatus may include: a second obtaining module 111, a second frequency domain transformation module 112, an extraction module 113, and a recognition module 114.

The second obtaining module 111 is configured to obtain a transformed image corresponding to an original image.

The second frequency domain transformation module 112 is configured to perform frequency domain transformation on the transformed image to obtain a converted brightness matrix of the transformed image in a frequency domain space.

The extraction module 113 is configured to extract a pixel value of an identification image from the converted brightness matrix to obtain the identification image.

The recognition module 114 is configured to perform image identification on the identification image to obtain identification information of the transformed image.

In an embodiment, the identification information includes a character. The recognition module 114 may be configured to:
  obtain a character-pixel mapping set including a relationship between a character and pixel points;
  obtain the character corresponding to pixel points in the identification image based on the character-pixel mapping set; and
  determine the identification information of the transformed image based on the character corresponding to the pixel points in the identification image.

In an embodiment, the recognition module 114 may be configured to:
  perform inverse image scrambling transformation on the identification image to obtain a binary image; and
  perform image identification on the binary image based on the character-pixel mapping set to obtain the character corresponding to the pixel points in the identification image.

In an embodiment, the recognition module 114 may be configured to:
  determine a transformation key for image scrambling;
  obtain an image scrambling mapping set based on the transformation key, the image scrambling mapping set including a relationship between pre-image scrambling pixel points and post-image scrambling pixel points; and
  perform mapping transformation on the pixel points in the identification image based on the image scrambling mapping set to obtain the binary image.

In an embodiment, the extraction module 113 may be configured to:
  determine an image embedding bit in the converted brightness matrix;
  obtain a pixel value of the image embedding bit in the converted brightness matrix; and
  determine the pixel value of the identification image based on the pixel value of the image embedding bit in the converted brightness matrix to obtain the identification image.

In an embodiment, the second frequency domain transformation module 112 may be configured to:
  perform frequency domain transformation on the transformed image to obtain an embedded matrix; and
  perform matrix decomposition on the embedded matrix to obtain the transformed brightness matrix of the transformed image in the frequency domain space.

As described above, according to the embodiments of the disclosure, the transformed image corresponding to the original image may be obtained through the second obtaining module 111, frequency domain transformation is performed on the transformed image through the second frequency domain transformation module 112 to obtain the converted brightness matrix of the transformed image in the frequency domain space, the pixel value of the identification image is extracted from the converted brightness matrix through the extraction module 113 to obtain the identification image, and image identification is performed on the identification image through the recognition module 114 to obtain the identification information of the transformed image. The identification image may be extracted from the transformed image, and image identification is performed on the identification image to obtain the identification information of the transformed image, thereby improving information security.

Figure 12:
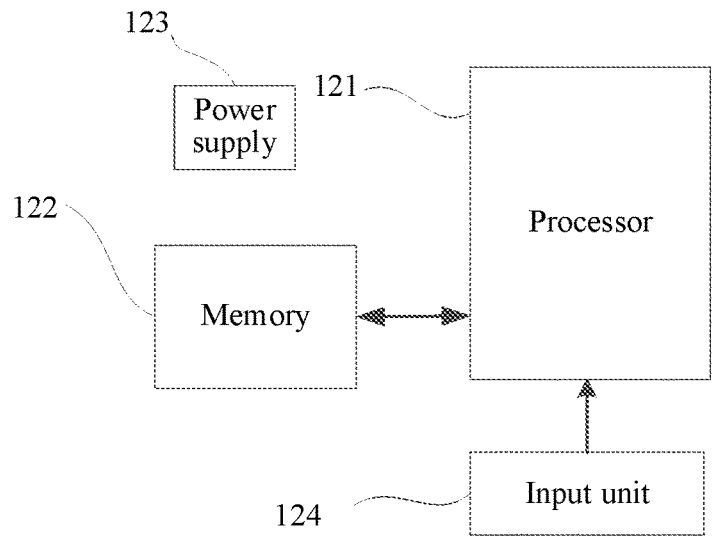
FIG. 12 is a schematic structural diagram of a computer device according to an embodiment of the disclosure.

An embodiment of the disclosure further provides a computer device, which may be a server, a terminal or another device. The computer device is integrated with any image transformation apparatus provided in the embodiments of the disclosure. FIG. 12 is a schematic structural diagram of a computer device according to an embodiment of the disclosure.

The computing device may include components such as a processor 121 of one or more processing cores, a memory 122 of one or more computer readable storage media, a power supply 123, and an input unit 124. A person skilled in the art may understand that, the structure of the computer device shown in FIG. 12 does not constitute a limitation to the computer device. The computer device may include components that are more or fewer than those shown in the figure, or some components may be combined, or a different component deployment may be used.

In an embodiment, the processor 121 is a control center of the computer device, and connects to various parts of the entire computer device by using various interfaces and lines. By running or executing software programs and/or modules stored in the memory 122, and invoking data stored in the memory 122, the processor performs various functions and data processing of the computer device, thereby performing overall monitoring on the computer device. In an embodiment, the processor 121 may include one or more processing cores. The processor 121 may integrate an application processor and a modem processor. The application processor mainly processes an operating system, a user interface, an application, and the like, and the modem processor mainly processes wireless communication. It may be understood that the foregoing modem processor may either not be integrated into the processor 121.

The memory 122 may be configured to store a software program and module. The processor 121 runs the software program and module stored in the memory 122, to implement various functional applications and data processing. The memory 122 may mainly include a program storage area and a data storage area. The program storage area may store an operating system, an application program required by at least one function (for example, a sound playback function and an image display function), and the like. The data storage area may store data created according to use of the computer device, and the like. In addition, the memory 122 may include a high speed random access memory, and may also include a non-volatile memory, such as at least one magnetic disk storage device, a flash memory, or another volatile solid-state storage device. Correspondingly, the memory 122 may further include a memory controller, so that the processor 121 may access the memory 122.

The computer device further includes the power supply 123 for supplying power to the components. The power supply 123 may be logically connected to the processor 121 by using a power management system, thereby implementing functions such as charging, discharging, and power consumption management by using the power management system. The power supply 123 may further include one or more of a direct current or alternating current power supply, a re-charging system, a power failure detection circuit, a power supply converter or inverter, a power supply state indicator, and any other components.

The computing device may further include the input unit 124. The input unit 124 may be configured to receive entered numeric or character information and generate keyboard, mouse, joystick, optical, or trackball signal input related to user settings and function control.

Although not shown in the figure, the computer device may further include a display unit, and the like. Details are not described herein again. Specifically, in this embodiment, the processor 121 in the computer device may load executable files corresponding to processes of one or more application programs to the memory 122 according to the following instructions, and the processor 121 runs the application programs stored in the memory 122, to implement various functions:

obtaining identification information of an original image; converting the identification information to an identification image; performing frequency domain transformation on the original image to obtain a pixel matrix of the original image in a frequency domain space; performing matrix decomposition on the pixel matrix to obtain an image brightness matrix; converting pixel values of corresponding pixels in the image brightness matrix based on the pixel values of the pixels in the identification image to obtain the converted brightness matrix; and performing inverse frequency domain transformation on the converted brightness matrix to obtain the transformed image.

Specifically, in this embodiment, the processor 121 in the computer device may load executable files corresponding to processes of one or more application programs to the memory 122 according to the following instructions, and the processor 121 runs the application programs stored in the memory 122, to implement various functions:

obtaining a transformed image corresponding to an original image; performing frequency domain transformation on the transformed image to obtain a converted brightness matrix of the transformed image in a frequency domain space; extracting a pixel value of an identification image from the converted brightness matrix to obtain the identification image; and performing image identification on the identification image to obtain identification information of the transformed image.

For illustrative details of the above operations, the foregoing embodiments may be referred to. Details are not described herein again.

As described above, according to the embodiments of the disclosure, the identification information of the original image may be obtained, the identification information is converted to the identification image, frequency domain transformation is performed on the original image to obtain the pixel matrix of the original image in the frequency domain space, matrix decomposition is performed on the pixel matrix to obtain the image brightness matrix, the pixel values of the corresponding pixels in the image brightness matrix are converted based on the pixel values of the pixels in the identification image to obtain the converted brightness matrix, and inverse frequency domain transformation is performed on the converted brightness matrix to obtain the transformed image. The invisible identification information is added to the original image. When other users need to obtain the identification information of the original image, the identification information of the original image needs to be recognized from the transformed image including the invisible identification information through some information recognition technologies, thereby improving information security. In addition, since the added identification information is imperceptible, quality of the original image is not affected. The added identification information has high robustness, which means that even if the original image undergoes processing such as cropping, rotation, re-recording, compression, re-encoding, transmission interference, and the like, integrity of the identification information may be well maintained.

A person of ordinary skill in the art may understand that, all or some operations of the methods in the foregoing embodiments may be implemented by using instructions, or implemented through instructions controlling relevant hardware, and the instructions may be stored in a computer-readable storage medium and loaded and executed by a processor.

Accordingly, an embodiment of the disclosure provides a storage medium, storing a plurality of instructions. The instructions may be loaded by a processor, to perform the operations in any image transformation method according to the embodiments of the disclosure. For example, the instructions may perform the following operations:

obtaining identification information of an original image; converting the identification information to an identification image; performing frequency domain transformation on the original image to obtain a pixel matrix of the original image in a frequency domain space; performing matrix decomposition on the pixel matrix to obtain an image brightness matrix; converting pixel values of corresponding pixels in the image brightness matrix based on the pixel values of the pixels in the identification image to obtain the converted brightness matrix; and performing inverse frequency domain transformation on the converted brightness matrix to obtain the transformed image.

An embodiment of the disclosure may provide a storage medium, storing a plurality of instructions. The instructions may be loaded by a processor, to perform the operations in any image transformation method according to the embodiments of the disclosure. For example, the instructions may perform the following operations:

obtaining a transformed image corresponding to an original image; performing the frequency domain transformation on the transformed image to obtain a converted brightness matrix of the transformed image in a frequency domain space; extracting a pixel value of an identification image from the converted brightness matrix to obtain the identification image; and performing image identification on the identification image to obtain identification information of the transformed image.

For illustrative details of the above operations, the foregoing embodiments may be referred to. Details are not described herein again.

The storage medium may include a read-only memory (ROM), a random access memory (RAM), a magnetic disk, an optical disc, or the like.

Because the instructions stored in the storage medium may perform the operations of any image transformation method provided in the embodiments of the disclosure, the instructions may implement beneficial effects that may be implemented by any image transformation method provided in the embodiments of the disclosure. For details, reference may be made to the foregoing embodiments. Details are not described herein again.

According to the embodiments of the disclosure, identification information of an original image is obtained, the identification information is converted to an identification image, frequency domain transformation is performed on the original image to obtain a pixel matrix of the original image in a frequency domain space, matrix decomposition is performed on the pixel matrix to obtain an image brightness matrix, pixel values of corresponding pixels in the image brightness matrix are converted based on pixel values of pixels in the identification image to obtain a converted brightness matrix, and inverse frequency domain transformation is performed on the converted brightness matrix to obtain a transformed image. The invisible identification information may be added to the original image. When other users need to obtain the identification information of the original image, the identification information of the original image needs to be recognized from the transformed image through some information recognition technologies, thereby improving information security. In addition, since the added identification information is imperceptible, quality of the original image is not affected.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The image transformation method and apparatus and the storage medium provided in the embodiments of the disclosure are described above in detail. Although the principles and implementations of the disclosure are described by using example embodiments, the descriptions of the foregoing embodiments are merely intended to help understand the method and the inventive concept of the method of the disclosure. A person skilled in the art may make modifications to the specific implementations and application range according to the idea of the disclosure. In conclusion, the content of this specification is not to be construed as a limitation to the disclosure.

What is claimed is:

1. An image transformation method, performed by a computer device, the method comprising:
obtaining identification information of an original image;
converting the identification information to an identification image;
performing frequency domain transformation on the original image to obtain a pixel matrix of the original image in a frequency domain space;
performing matrix decomposition on the pixel matrix to obtain an image brightness matrix;
converting pixel values of corresponding pixels in the image brightness matrix based on pixel values of pixels in the identification image to obtain a converted brightness matrix; and
performing inverse frequency domain transformation on the converted brightness matrix to obtain a transformed image including invisible identification information, and adding the invisible identification information to the original image,
wherein the converting the pixel values comprises:
determining an image embedding bit in the identification image;
obtaining a pixel value of the image embedding bit in the identification image;
determining an embedding intensity factor, and determining a pixel adjustment range by using a pixel conversion formula, which is based on the embedding intensity factor and the pixel value of the image embedding bit in the identification image, wherein one of different pixel conversion formulas is selected according to the pixel value of the image embedding bit; and
converting the pixel value of the image embedding bit in the image brightness matrix based on the pixel adjustment range, to obtain the converted brightness matrix.

2. The image transformation method according to claim 1, wherein the identification information comprises a character, and
the converting the identification information comprises:
obtaining a character-pixel mapping set comprising a relationship between the character and pixel points;
obtaining the pixel points corresponding to the character in the identification information based on the character-pixel mapping set; and
generating the identification image based on the pixel points corresponding to the character.

3. The image transformation method according to claim 2, wherein the generating the identification image comprises:
binarizing the pixel points corresponding to the character to obtain a binary image; and
performing image scrambling on the binary image to obtain the identification image.

4. The image transformation method according to claim 3, wherein the performing the image scrambling comprises:
determining a transformation key for image scrambling;
obtaining an image scrambling mapping set based on the transformation key, the image scrambling mapping set comprising a relationship between pre-image scrambling pixel points and post-image scrambling pixel points; and
performing mapping transformation on the pixel points in the binary image based on the image scrambling mapping set to obtain the identification image.

5. The image transformation method according to claim 1, wherein the performing the frequency domain transformation comprises:
performing the frequency domain transformation on the original image to obtain a plurality of candidate pixel matrices of the original image in the frequency domain space; and
selecting the pixel matrix of the original image in the frequency domain space from the plurality of candidate pixel matrices based on frequencies of the plurality of candidate pixel matrices.

6. The image transformation method according to claim 1, wherein the performing the inverse frequency domain transformation comprises:
performing inverse matrix decomposition on the converted brightness matrix to obtain an embedded matrix; and
performing the inverse frequency domain transformation on the embedded matrix to obtain the transformed image.

7. An image transformation method, applicable to a computer device, the method comprising:
obtaining a transformed image corresponding to an original image;
performing frequency domain transformation on the transformed image to obtain a converted brightness matrix of the transformed image in a frequency domain space;
extracting a pixel value of an identification image from the converted brightness matrix, the identification image being an image obtained by converting identification information of the original image; and
performing image identification on the identification image to obtain the identification information of the original image,
wherein the extracting the pixel value comprises:
determining an image embedding bit in the converted brightness matrix;
obtaining a pixel value of the image embedding bit in the converted brightness matrix;
determining an embedding intensity factor, and determining a pixel adjustment range by using a pixel conversion formula, which is based on the embedding intensity factor and the pixel value of the image embedding bit in the identification image, wherein one of different pixel conversion formulas is selected according to the pixel value of the image embedding bit; and
determining the pixel value of the identification image based on the pixel value of the image embedding bit in the converted brightness matrix and the pixel adjustment range, to obtain the identification image.

8. The image transformation method according to claim 7, wherein the identification information comprises a character, and
the performing the image identification comprises:
obtaining a character-pixel mapping set comprising a relationship between the character and pixel points;
obtaining the character corresponding to the pixel points in the identification image based on the character-pixel mapping set; and
determining the identification information of the transformed image based on the character corresponding to the pixel points in the identification image.

9. The image transformation method according to claim 8, wherein the obtaining the character comprises:
performing inverse image scrambling transformation on the identification image to obtain a binary image; and performing image identification on the binary image based on the character-pixel mapping set to obtain the character corresponding to the pixel points in the identification image.

10. The image transformation method according to claim 9, wherein the performing the inverse image scrambling transformation comprises:
   determining a transformation key for image scrambling;
   obtaining an image scrambling mapping set based on the transformation key, the image scrambling mapping set comprising a relationship between pre-image scrambling pixel points and post-image scrambling pixel points; and
   performing mapping transformation on the pixel points in the identification image based on the image scrambling mapping set to obtain the binary image.

11. The image transformation method according to claim 7, wherein the performing the frequency domain transformation comprises:
   performing the frequency domain transformation on the transformed image to obtain an embedded matrix; and
   performing matrix decomposition on the embedded matrix to obtain the converted brightness matrix of the transformed image in the frequency domain space.

12. An image transformation apparatus, comprising:
   at least one memory configured to store program code; and
   at least one processor configured to read the program code and operate as instructed by the program code, the program code comprising:
   first obtaining code configured to cause the at least one processor to obtain identification information of an original image;
   information conversion code configured to cause the at least one processor to convert the identification information to an identification image;
   first frequency domain transformation code configured to cause the at least one processor to perform frequency domain transformation on the original image to obtain a pixel matrix of the original image in a frequency domain space;
   decomposition code configured to cause the at least one processor to perform matrix decomposition on the pixel matrix to obtain an image brightness matrix;
   pixel conversion code configured to cause the at least one processor to convert pixel values of corresponding pixels in the image brightness matrix based on pixel values of pixels in the identification image to obtain a converted brightness matrix; and
   inverse transformation code configured to cause the at least one processor to perform inverse frequency domain transformation on the converted brightness matrix to obtain a transformed image including invisible identification information, and add the invisible identification information to the original image,
   wherein the pixel conversion code comprises:
   determination sub-code configured to cause the at least one processor to determine an image embedding bit in the identification image;
   pixel value obtaining sub-code configured to cause the at least one processor to obtain a pixel value of the image embedding bit in the identification image; and
   pixel value conversion sub-code configured to cause the at least one processor to:
      determine an embedding intensity factor, and determine a pixel adjustment range by using a pixel conversion formula, which is based on the embedding intensity factor and the pixel value of the image embedding bit in the identification image, wherein one of different pixel conversion formulas is selected according to the pixel value of the image embedding bit; and
      convert the pixel value of the image embedding bit in the image brightness matrix based on the pixel adjustment range, to obtain the converted brightness matrix.

13. The image transformation apparatus according to claim 12, wherein the identification information comprises a character, and the information conversion code comprises:
   first obtaining sub-code configured to cause the at least one processor to obtain a character-pixel mapping set comprising a relationship between the character and pixel points;
   second obtaining sub-code configured to cause the at least one processor to obtain the pixel points corresponding to the character in the identification information based on the character-pixel mapping set; and
   generation sub-code configured to cause the at least one processor to generate the identification image based on the pixel points corresponding to the character.

14. The image transformation apparatus according to claim 12, wherein the first frequency domain transformation code comprises:
   first transformation sub-code configured to cause the at least one processor to perform the frequency domain transformation on the original image to obtain a plurality of candidate pixel matrices of the original image in the frequency domain space; and
   selection sub-code configured to cause the at least one processor to select the pixel matrix of the original image in the frequency domain space from the plurality of candidate pixel matrices based on frequencies of the plurality of candidate pixel matrices.

15. A non-transitory storage medium storing instructions, the instructions, when executed by at least one processor, causing the at least one processor to perform the method of claim 1.

16. A computer device, comprising at least one processor and at least one memory storing a plurality of instructions, the plurality of instructions being executable by the at least one processor to perform the method of claim 7.

* * * * *